(12) United States Patent
Hikita et al.

(10) Patent No.: US 8,262,066 B2
(45) Date of Patent: Sep. 11, 2012

(54) VAPOR CONTACT-TYPE HEATING DEVICE

(75) Inventors: Makoto Hikita, Osaka (JP); Hideo Tsukazaki, Toride (JP)

(73) Assignee: Hisaka Works, Ltd., Osaka (JP)

( * ) Notice: Subject to any disclaimer, the term of this patent is extended or adjusted under 35 U.S.C. 154(b) by 548 days.

(21) Appl. No.: 12/513,552

(22) PCT Filed: Nov. 6, 2007

(86) PCT No.: PCT/JP2007/071584
§ 371 (c)(1),
(2), (4) Date: May 5, 2009

(87) PCT Pub. No.: WO2008/056683
PCT Pub. Date: May 15, 2008

(65) Prior Publication Data
US 2010/0065259 A1 Mar. 18, 2010

(30) Foreign Application Priority Data
Nov. 9, 2006 (JP) ................................ 2006-304429

(51) Int. Cl.
*B01F 3/04* (2006.01)
(52) U.S. Cl. .......................... 261/28; 261/93
(58) Field of Classification Search .................... 261/28, 261/84, 91, 92, 93, DIG. 10
See application file for complete search history.

(56) References Cited

U.S. PATENT DOCUMENTS

| 1,927,376 A * | 9/1933 | Schroder et al. ............... 261/93 |
| 2,077,227 A | 4/1937 | Bethune |
| 2,098,378 A * | 11/1937 | Dodge ........................... 261/28 |
| 2,492,635 A | 12/1949 | Hawk |
| 2,577,095 A * | 12/1951 | Walker ........................... 261/93 |
| 2,663,556 A * | 12/1953 | Kostka ......................... 261/64.1 |
| 2,717,770 A * | 9/1955 | Gibson et al. .................. 261/28 |
| 3,182,975 A | 5/1965 | Stewart, Jr. |
| 3,241,475 A | 3/1966 | Schack et al. |
| 3,837,627 A * | 9/1974 | Sence et al. ..................... 261/29 |
| 3,973,048 A | 8/1976 | Sollerud |
| 5,582,777 A * | 12/1996 | Vento ............................. 261/93 |
| 5,996,977 A * | 12/1999 | Burgess ..................... 261/140.1 |
| 6,655,663 B2 * | 12/2003 | Vento ............................. 261/29 |

(Continued)

FOREIGN PATENT DOCUMENTS
JP 41-002110 2/1966
(Continued)

OTHER PUBLICATIONS

International Search Report mailed Feb. 12, 2008 for International Application No. PCT/JP2007/071584.

(Continued)

*Primary Examiner* — Charles Bushey
(74) *Attorney, Agent, or Firm* — Wenderoth, Lind & Ponack, L.L.P.

(57) ABSTRACT

A vapor contact-type heating device which achieves a high-quality heat treatment is provided by increasing the mixing efficiency of vapor and supplying vapor at a relatively low pressure. By providing a pressurizing duct 45 of the liquid within a vapor mixing pump 4 as a fluid transfer device and providing a vapor supply port 46 on a casing 43 in such a manner that the vapor supply port 46 opens to this pressurizing duct 45, a vapor supply region 47 is formed in the pressurizing duct 45.

5 Claims, 3 Drawing Sheets

FOREIGN PATENT DOCUMENTS

| | | |
|---|---|---|
| JP | 45-20468 | 7/1970 |
| JP | 02-294593 | 12/1990 |
| JP | 2-299573 | 12/1990 |
| JP | 7-37703 | 7/1995 |
| JP | 11-262363 | 9/1999 |
| JP | 2000-300976 | 10/2000 |
| JP | 2004-201533 | 7/2004 |

OTHER PUBLICATIONS

International Preliminary Report on Patentability and Written Opinion of the International Searching Authority dated May 26, 2009 for International Application No. PCT/JP2007/071584.

Supplementary European Search Report issued Oct. 11, 2011 in corresponding European Patent Application No. 07831316.0.

* cited by examiner

Fig. 3

| Temperature setting | Flow rate | Pump inlet pressure | Pump inlet temperature | Pump outlet pressure | Pump outlet temperature | Pressure of vapor introduced | Number of revolutions of pump | Pump intermediate pressure |
|---|---|---|---|---|---|---|---|---|
| T0 [°C] | Q1 [L/H] | P1 [MPa] | T1 [°C] | P2 [MPa] | T2 [°C] | P3 [MPa] | n [Hz] | P4 [MPa] |
| 120 | 100 | 0.15 | 80 | 0.39 | 119.5 | 0.32/0.28 | 34 | 0.32 |
| 130 | 100 | 0.18 | 80.1 | 0.42 | 130.5 | 0.37/0.32 | 34 | 0.35 |
| 140 | 100 | 0.24 | 80 | 0.44 | 140.6 | 0.45/0.38 | 34 | 0.36 |
| 145 | 100 | 0.27 | 80.1 | 0.44 | 144.8 | 0.50/0.43 | 34 | 0.39 |
| 120 | 100 | 0.1 | 80 | 0.39 | 119.3 | 0.29/0.25 | 43 | 0.34 |
| 125 | 100 | 0.11 | 80 | 0.41 | 124.2 | 0.32/0.28 | 43 | 0.35 |
| 130 | 100 | 0.15 | 80.1 | 0.44 | 129.7 | 0.36/0.30 | 43 | 0.37 |
| 120 | 50 | 0.19 | 80 | 0.4 | 119.7 | 0.33/0.30 | 32 | 0.35 |
| 130 | 50 | 0.22 | 80.1 | 0.42 | 129.3 | 0.36/0.34 | 32 | 0.36 |
| 140 | 50 | 0.3 | 80 | 0.47 | 140.8 | 0.45/0.40 | 32 | 0.4 |
| 145 | 50 | 0.35 | 80.1 | 0.55 | 144.7 | 0.5/0.48 | 32 | 0.48 |
| 120 | 50 | 0.09 | 80.1 | 0.4 | 120.3 | 0.28/0.25 | 40 | 0.33 |
| 125 | 50 | 0.14 | 80 | 0.46 | 124.4 | 0.33/0.3 | 40 | 0.38 |
| 130 | 50 | 0.16 | 80 | 0.47 | 130.9 | 0.35/0.33 | 40 | 0.39 |

VAPOR CONTACT-TYPE HEATING DEVICE

TECHNICAL FIELD

The present invention relates to a fluid heating device, especially a vapor contact-type heating device which heats a fluid by bringing vapor into direct contact with the fluid.

BACKGROUND ART

Heating devices of this type are used for various fluid heating devices, for example, continuous liquid heating devices, continuous liquid sterilization devices, and hot water manufacturing devices.

Examples of methods for sterilizing liquid foods include the indirect heating method in which the food is heated indirectly through a metal wall and the like, and the direct vapor heating method in which the liquid is directly heated by vapor. Among these, there is a trend that as a method for sterilizing liquids which are easily burnt, such as coffee creamer and soybean milk, or liquids which are easily discolored, such as aojiru (juice of green, leafy vegetables), the direct vapor heating method which requires a shorter heating time, has small thermal effect on the liquid, and is capable of preventing degradation of the quality of the liquid is preferably used.

For example, Japanese Unexamined Patent Publication No. 2004-201533 (Patent Document 1) discloses that a vapor blowing direct heat sterilizer comprising an injection heater in which the liquid is heated to a sterilization temperature by blowing vapor directly into the liquid to be sterilized.

Japanese Unexamined Patent Publication No. 2000-300976(Patent Document 2) discloses a continuous fluid heating device which consists of a metering pump for transferring a fluid to be heated, and a static mixer which heats the fluid to be heated transferred from the metering pump by directly mixing steam into the fluid.

Patent Document 2 describes that a dispersive mixer disclosed in Japanese Utility Model Publication No. 1995-37703(Patent Document 3) can be used as the static mixer by which vapor (steam) is blown and mixed directly into the fluid to be heated. In this document, the dispersive mixer disclosed in Patent Document 3 mainly comprises, thereinside, a conduit pipe for passing a main fluid (fluid to be heated) on which a stirring element such as a twisted plate is fixed, a nozzle connected to the inside of this conduit pipe, and a header for infusing an infusion fluid (vapor) into the conduit pipe via this nozzle, and a force-feed means for force-feeding the infusion fluid to the header.

SUMMARY OF THE INVENTION

Technical Problem

As mentioned above, static mixing methods are adopted as methods for mixing vapor into a liquid, as disclosed in Patent Documents 2 and 3, but mixing efficiency of vapor is insufficient in some cases depending on the liquid to be heated or sterilized. Accordingly, vapor and the liquid are not uniformly mixed, and uneven heating and sterilization may occur.

Since the fluid to be heated and fed to the mixer stated above is transferred by a metering pump, the pressure of the fluid is high, and a correspondingly high liquid pressure is necessary for the fluid to pass through the stirring element as stated above. Therefore, in order to mix vapor into the fluid to be heated in the mixer arranged downstream of the pump, a vapor pressure higher than the discharge pressure of the pump is necessary, and a high vapor supply pressure is required as a result. In this manner, the fluid is unnecessarily heated at a temperature higher than the desired sterilization temperature, which may undesirably cause heat damage to the fluid to be heated and thus lowered quality of the fluid.

In view of the foregoing, it is a technical object of the present invention to provide a vapor contact-type heating device which can increase the mixing efficiency of vapor and realize a high-quality heat treatment by providing vapor at a relatively low pressure.

Solution to Problem

In order to achieve the object mentioned above, the present invention provides a vapor contact-type heating device which comprises a fluid transfer means which transfers a fluid with an increase in pressure by the action of a rotor, and a vapor supply region which supplies vapor to the fluid, wherein the fluid transfer means is provided with an inlet and an outlet of the fluid, and a pressurizing duct is formed between the inlet and the outlet, and a vapor supply region is arranged in the pressurizing duct by providing a supply port of vapor on the pressurizing duct.

According to the constitution stated above, the fluid is transferred by the action of the rotor, and simultaneously vapor is blown into the vapor supply region provided in the pressurizing duct via the vapor supply port, whereby mixing of the fluid and vapor inside the fluid transfer means and increasing the pressure of the mixed fluid are simultaneously carried out. Normally, the rotor arranged inside the fluid transfer means forms a pressurizing duct, or faces the duct, and therefore the fluid and the vapor provided for the fluid are agitated and mixed by rotating such a rotor. Accordingly, dynamic mixing of the fluid and vapor is made possible, and vapor can be mixed into the fluid uniformly.

By mixing vapor into the fluid which is in the pressurizing duct inside the fluid transfer means and is being transferred from the inlet to the outlet by an increase in the pressure, it is possible to supply vapor at a pressure lower than in a case where vapor is supplied after the pressure of the fluid has been increased as in a known example. Accordingly, the temperature of the vapor to be supplied can be relatively low, which causes no heat damage to the fluid to be heated caused by unnecessary heating, or deterioration of the quality of the fluid. Moreover, low-pressure vapor, which has a smaller fluctuation in pressure, allows stable heat treatment. Furthermore, since arranging the vapor supply region in the pressurizing duct allows increasing the pressure of the fluid even after the vapor has been supplied, cavitation, which may be caused with an increase in the temperature of the liquid caused by supplying vapor, can be avoided as much as possible. This allows vapor to be uniformly dissolved into the fluid, achieving stable heat treatment with little variation.

The fluid transfer means provided with the vapor supply region thereinside may be any device which comprises a rotor and is capable of increasing the pressure of the fluid and dynamically mix the same simultaneously by the rotational action of the rotor. Specific examples of such means include non-positive displacement pumps typically including centrifugal pumps and peripheral pumps, or rotary positive displacement pumps such as rotary pumps and screw pumps. In this case, the pressurization effect of the pump is normally produced by the rotor arranged inside the pump, which converts the rotation energy of itself into a pressure energy and imparts it to the fluid, and therefore the amount of pressure increased can be adjusted, for example, by the number of revolutions of the rotor. This enables the quantitative control of the pressure of vapor supplied and the pressure of the fluid within the pump, and also readily realizes its automation. Moreover, since the pressure balance can be adjusted by the number of revolutions of the pump, vapor having a temperature desirable for the fluid can be readily introduced. This allows application of the heating device according to the present invention to various fluids.

When the fluid is sterilized with heating by using the heating device according to the present invention, it is often the case that substantially effective and sufficient sterilization is carried out by retaining the fluid heated by a hold pipe arranged downstream of the fluid transfer means for supplying vapor for a certain period of time. Accordingly, the fluid pressure actually needs to be maintained at a high level further downstream of the fluid transfer means. From such a perspective, in the present invention, the pressure of the fluid at the outlet provided in the fluid transfer means and downstream thereof is maintained higher than the pressure of vapor at the supply port of vapor. More specifically, a back pressure regulating valve is provided downstream of the outlet of the fluid transfer means.

By providing such a constituting, the fluid pressure (outlet pressure) at the outlet of the fluid transfer means can be retained at a predetermined value. Accordingly, the vapor mixed fluid can be maintained at a high pressure so that the vapor which has once been dissolved in the fluid does not cause cavitation, achieving more stable heat sterilization. Moreover, if the pressure on the outlet side of the pump can be set as stated above, the pressure balance in the vapor supply region can be controlled more accurately by setting the number of revolutions of the pump simultaneously. Accordingly, visualization of adjustment parameters of the pressure balance is achieved, and precise and stable operation is made possible. In particular, in a heat sterilization process of a liquid food with which subtle adjustments are necessary, required sterilization temperature may vary depending on the food. However, even in this case, a vapor pressure (temperature) which can be provided is determined based on a saturated vapor pressure depending on the sterilization temperature. Therefore, the back pressure and number of revolutions of the pump may be set so that such vapor can be provided. Accordingly, appropriate vapor which is desirable the fluid to be heated can be provided, and for example, various heat sterilization processes can be readily handled.

ADVANTAGEOUS EFFECTS OF INVENTION

As mentioned above, according to the present invention, it is possible to provide a vapor contact-type heating device which can increase the mixing efficiency of vapor and realize a high-quality heat treatment by providing vapor at a relatively low pressure.

BRIEF DESCRIPTION OF THE DRAWINGS

FIG. 3 shows the results of the liquid heating test in which the heating device according to the present invention was used.

DETAILED DESCRIPTION OF THE INVENTION

One embodiment of the vapor contact-type heating device according to the present invention will be described below with reference to drawings.

Figure 1:
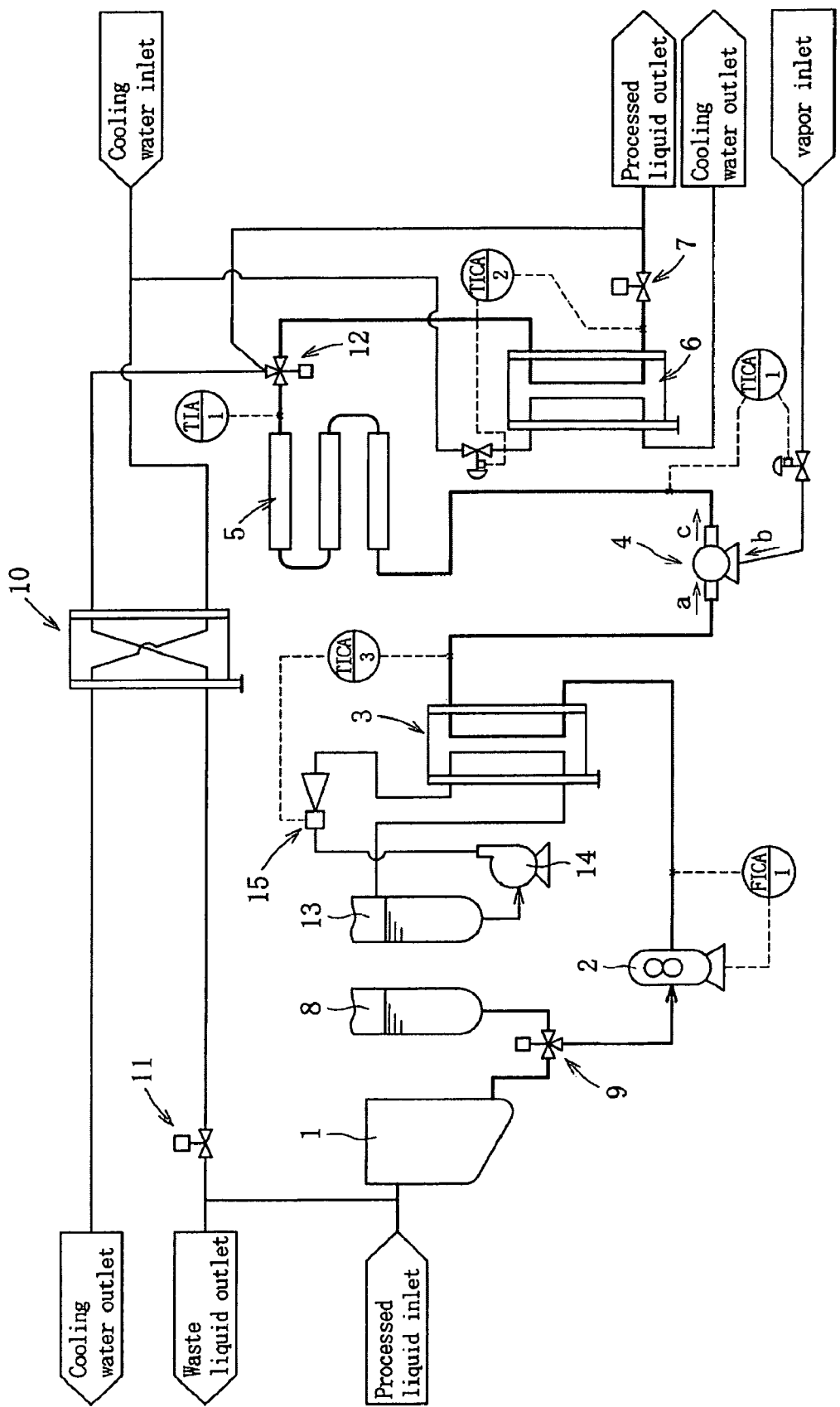
FIG. 1 is a schematic diagram which shows a constitutional example of the vapor contact-type heating device according to the present invention.

The vapor contact-type heating device shown in FIG. 1 is used, for example, for heat sterilization of fluids, and comprises, as main components, a liquid tank 1 for storing and discharging a fluid which is an object of heat treatment, a transfer pump 2 for transferring the fluid in the liquid tank 1 to a heat exchanger 3 and a vapor mixing pump 4 described later, a heat exchanger 3 which preheats the fluid transferred from the transfer pump 2 for the purpose of bringing the temperature of the fluid close to that of the vapor to be mixed, a vapor mixing pump 4 for mixing vapor into the fluid preheated by the heat exchanger 3 and heating the fluid to a sterilization temperature, a hold pipe 5 which retains, for a certain period of time, the fluid heated by mixing vapor to stimulate the sterilizing action of the fluid, a main cooler 6 for cooling the fluid which has undergone the sterilization process in the hold pipe 5 to a predetermined temperature or lower, and a main back pressure regulating valve 7 which is arranged downstream of the main cooler 6 and retains the back pressure at a constant level.

In FIG. 1, numeral 8 represents a water tank which stores and discharges the water used for cleaning or sterilizing process of the fluid system (duct) in the vapor contact-type heating device, and numeral 9 represents a first switching valve which switches between a line from the liquid tank 1 and a line from the water tank 9 depending on operation conditions.

In FIG. 1, numeral 10 represents a waste water cooler which cools the liquid so that the liquid which has been subjected to a process and the like can flow into a recovery line (waste water line) without any problem during a system sterilization process or when a sterilization process failure occurs; numeral 11 represents a waste water back pressure regulating valve which is provided downstream of the waste water cooler 10 and retains the back pressure of the waste water line at a constant level; and numeral 12 represents a second switching valve for transferring the processed liquid into the recovery line (waste water line) when the liquid temperature on the outlet side of the vapor mixing pump 4 (downstream of the outlet 42 described later) or the liquid temperature on the outlet side of the hold pipe 5 falls outside a target sterilization temperature range.

In FIG. 1, numerals 13, 14 and 15 represent a heat water tank for reserving a predetermined amount of heated water used for the heat exchanger 3 for preheating, a circulation pump for circulating hot water between the heat water tank 13 and the heat exchanger 3, and a heater which heats the hot water transferred from the circulation pump 14 to a predetermined temperature, respectively.

In this embodiment, a control unit for measuring and controlling the temperature and flow rate of various kinds of fluids is provided. For example, in FIG. 1, numeral TICA-1 represents a sterilization temperature control unit which measures the temperature of the liquid on the outlet side of the vapor mixing pump 4 by a temperature sensor, and adjusts the amount of vapor supplied to the vapor mixing pump 4 based on this measurement value, so that the temperature of the liquid in this measurement portion falls within a required temperature range. Similarly, numeral TICA-2 represents a cooling temperature control unit which measures the temperature of the liquid on the outlet side of the main cooler 6, and adjusts the amount of the cooling water supplied to the main cooler 6 based on this measurement value, so that the temperature of the liquid in this measurement portion falls within a required temperature range, and numeral TICA-3 represents a preheat temperature control unit which measures the temperature of the liquid on the outlet side of the heat exchanger 3, and adjusts the temperature (for example, the amount of heating by the heater 15) of the hot water used for the heat exchanger 3 based on this measurement value, so that the temperature of the liquid in this measurement portion falls within a required temperature range.

In FIG. 1, numeral TIA-1 represents a sterilization temperature control unit which is used for switching the lines of the second switching valve 12, measures the temperature of the liquid on the outlet side of the hold pipe 5, and, when this measurement value (temperature) does not fall within a required sterilization temperature range, transmits this information to the second switching valve 12 or transmits a switch signal. Moreover, numeral FICA-1 represents a flow rate control unit which measures the flow rate of the liquid on the outlet side of the transfer pump 2, and adjusts the number of revolutions (the frequency of an inverter in this case) of the transfer pump 2 based on this measurement value so that the flow rate of the liquid in this measurement portion falls within a predetermined range.

The constitution of the vapor mixing pump 4 will be now described.

Figure 2:
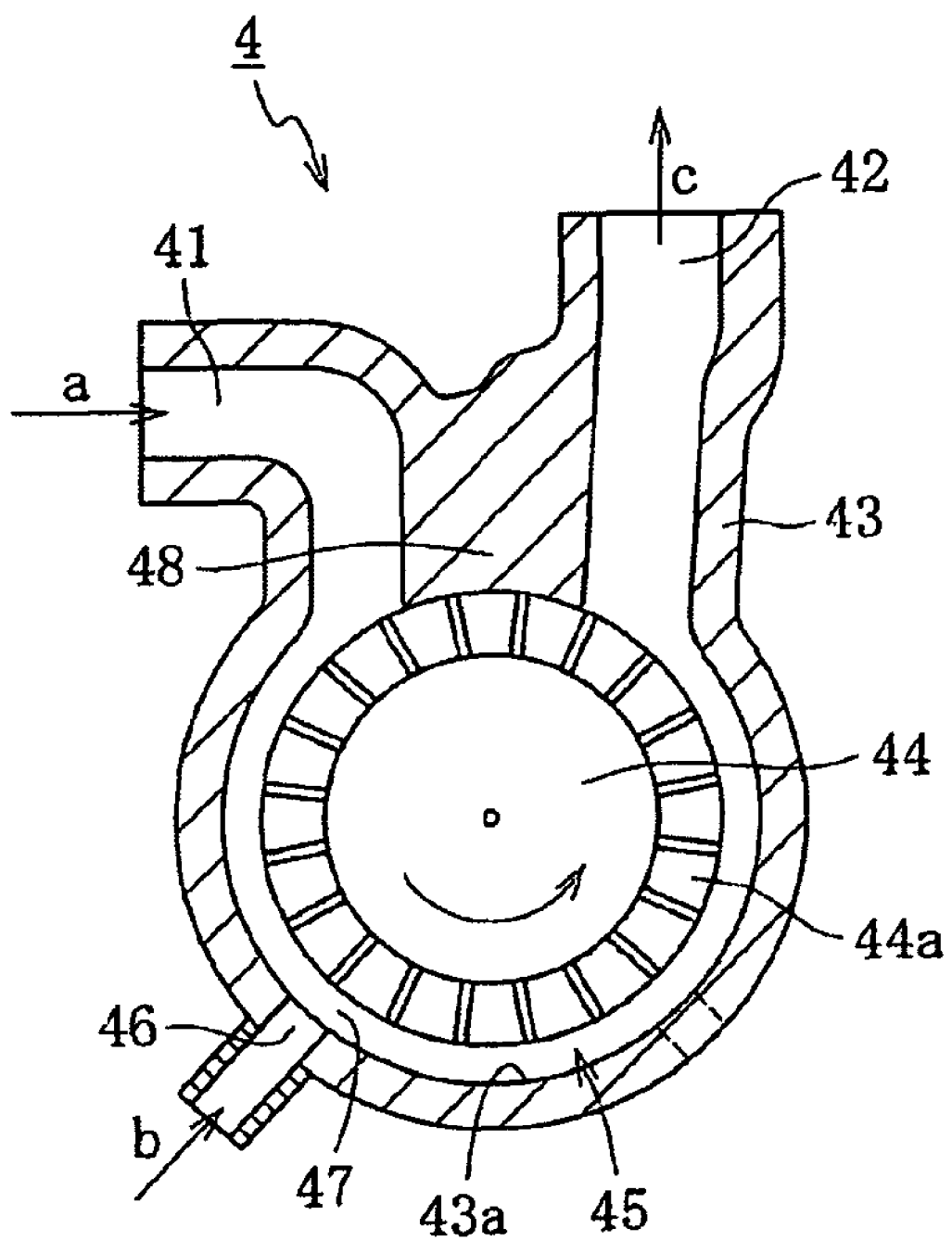
FIG. 2 is a cross-sectional view of the pump for mixing vapor perpendicular to the shaft of the pump.

FIG. 2 is a cross-sectional view of the vapor mixing pump 4 as the fluid transfer means provided with the vapor supply region thereinside, which is perpendicular to the shaft of the pump. As shown in FIG. 2, the vapor mixing pump 4 comprises a casing 43 having an inlet 41 (i.e., an inlet portion) and an outlet 42 (i.e., an outlet portion) for the liquid, and a rotor 44 contained within the casing 43 and rotatably connected to the drive shaft of a motor, which is not shown, a liquid pressurizing duct 45 formed between an inner wall 43a of the casing 43 and the rotor 44, and a vapor supply port 46 which is provided on the casing 43 and opens to the pressurizing duct 45. According to such a constitution, during rotation of the rotor 44 and introduction of vapor, a vapor supply region 47 for providing vapor to the liquid introduced into the pump 4 is formed in the opening portion of the vapor supply port 46.

In this embodiment, the vapor mixing pump 4 is constituted mainly of a cascade pump. A partition portion 48 is formed between the inlet 41 and the outlet 42, and the pressurizing duct 45, which serves as a fluid channel, is formed partly annularly along the outer periphery of the disk-shaped rotor 44 in a manner of connecting the inlet 41 and the outlet 42. This constitution causes the liquid which flows into the pressurizing duct 45 from the inlet 41 to flow the pressurizing duct 45 almost in a full circle of the rotor 44 and to be discharged from the outlet 42 to the outside. The rotor 44 is a so-called impeller in this illustrated example, and has a plurality of blade grooves 44a along its outer periphery. Moreover, the vapor supply port 46 is provided on the side closer to the inlet 41 than the middle position of the pressurizing duct 45 in this embodiment.

An example of the heat sterilization step of the processed liquid when the heating device having the constitution described above is used will be now described.

First, as shown in FIG. 1, the liquid discharged from the liquid tank 1 is transferred to the heat exchanger 3 positioned downstream of the transfer pump 2 by the transfer pump 2, and is subjected to a preheat treatment (for example, 50° C. or higher but lower than 100° C.) for bringing the temperature of the liquid close to that for heat treatment, which is described later. The liquid which has been subjected to a preheat treatment in such a manner is transferred to the vapor mixing pump 4 (fluid transfer means) positioned downstream thereof.

The liquid transferred to the vapor mixing pump 4 is introduced into the pressurizing duct 45 from the direction of arrow a through the inlet 41, as shown in FIG. 2. At this time, the rotor 44 connected to the drive shaft of the motor is rotated by driving the motor, which is not shown. In this embodiment, the rotor rotates in the direction from the inlet 41 to the outlet 42 along the pressurizing duct 45 so that the liquid introduced into the pressurizing duct 45 is transferred to the side of the outlet 42 by an increase in the pressure. Simultaneously, vapor is mixed into the liquid which is being transferred by an increased pressure in the vapor supply region 47 formed in the opening portion of the vapor supply port 46 by introducing vapor into the pressurizing duct 45 from the vapor supply port 46 provided on the casing 43 from the direction of arrow b. The liquid is heated to the heat sterilization temperature by providing vapor which is caused to have the temperature at which the heat sterilization is to be conducted or higher.

The liquid provided with vapor is dynamically mixed (agitated) by the rotor 44, transferred toward the side of the outlet 42 through the pressurizing duct 45 while being pressurized, and is discharged to the outside (in FIGS. 1 and 2, in the direction of arrow c) via the outlet 42 with the end of the agitation and pressurization. In this embodiment, the sterilization temperature control unit TICA-1 measures the temperature of the liquid on the outlet side of the vapor mixing pump 4 with a temperature sensor, and the amount of vapor supplied to the vapor mixing pump 4 is adjusted based on this measurement value, so that the temperature of the liquid in this measurement portion falls within a required temperature range. More specifically, opening and closing of a control valve arranged upstream of the vapor supply port 46 is controlled by the sterilization temperature control unit TICA-1 to adjust the flow rate of vapor.

The liquid heated to a predetermined temperature (heat sterilization temperature) by supplying vapor is retained in the hold pipe 5 positioned downstream of the vapor mixing pump 4 for a certain period of time to carry out a substantial sterilization process of the fluid. At this time, the liquid positioned at the outlet 42 of the vapor mixing pump 4 and downstream (including the inside of the hold pipe 5) thereof is retained under a constant pressure by the main back pressure regulating valve 7 arranged downstream of the hold pipe 5.

Thereafter, the heat sterilization step is completed by cooling the liquid which has undergone the sterilization process in the hold pipe 5 to a predetermined temperature or lower in the main cooler 6 (for example, lower than 100° C.).

As mentioned above, a constitution in which the liquid pressurizing duct 45 is provided within the vapor mixing pump 4 as a fluid transfer means, the vapor supply port 46 is provided on this pressurizing duct 45, and the vapor supply region 47 is formed within the pressurizing duct 45 is used for mixing vapor. Therefore, the liquid which is being pressurized and transferred can be supplied with vapor with agitation by the action of the rotor 44, which allows vapor to be uniformly mixed into the fluid, achieving stable heat treatment with little unevenness. Moreover, by mixing vapor into the liquid which is being pressurized and transferred, the pressure of vapor required can be lower than in a conventional case where, for example, vapor is mixed downstream of the pump as in conventional devices, and the generation of cavitation during heating can be also suppressed. Therefore, it is possible to avoid heating the liquid above the required sterilization temperature and suppress heat damage to the liquid to a low level, whereby the degradation of the quality can be minimized and sufficient heat sterilization process can be carried out at the same time.

As in this embodiment, by applying the pump (vapor mixing pump 4) as the fluid transfer means, the amount of increase in the pressure of the liquid (pressurization gradient) in the pressurizing duct 45 can be adjusted by the number of revolutions of the rotor 44. Accordingly, quantitative control of the pressure of vapor supplied and the pressure of the fluid within the pump 4 are made possible. For example, necessary pressure of vapor supplied saturated vapor pressure at the sterilization temperature) is determined depending on a desired sterilization temperature, and therefore it is also possible to adjust the number of revolutions (of the rotor 44) of the pump so that the liquid pressure in the vapor supply region 47 becomes slightly lower than the vapor pressure. Since the pressure balance can be adjusted by the number of revolutions of the pump 4 in such a manner, vapor having a temperature suitable for the liquid can be readily introduced, and the types of liquids which can be subjected to heat sterilization can be thus increased.

In this embodiment, since the main back pressure regulating valve 7 is provided downstream of the outlet 42 of the vapor mixing pump 4, the fluid pressure can be retained at a predetermined value in the hold pipe 5 arranged downstream of the vapor mixing pump 4. Accordingly, the vapor-liquid mixture can be maintained at a high pressure so that the vapor in the liquid does not cause cavitation once it is dissolved therein, achieving more stable heat sterilization. In this case, the liquid pressure on the outlet side of the pump 4 is controlled by the main back pressure regulating valve 7, and therefore the number of revolutions of the pump 4 substantially controls the liquid pressure on the inlet side of the pump 4.

Given the foregoing, more preferable heat sterilization control is achieved by adjusting the amount of vapor supplied by the sterilization temperature control unit TICA-1, measuring the pressure on the outlet side of the pump by a pressure sensor or the like, which is not illustrated, and controlling the amount of opening and closing of the main back pressure regulating valve 7 based on such a pressure value (flow rate). That is, more precise and stable heat sterilization process is achieved by using the number of revolutions of the vapor mixing pump 4, the temperature of the liquid on the outlet side of the pump, and the pressure of the liquid on the outlet side of the pump as control parameters. Therefore, precise and easy adjustment of a sterilization temperature required for a particular food is made possible even in the heat sterilization process of a liquid food with which subtle adjustments are necessary. In particular, re-heating, which cannot be conducted in vapor contact type heating methods since the liquid is diluted, can be carried out in this heating device (heat sterilization control means) since highly accurate and stable heat sterilization process is possible, thereby offering a very effective means of heat sterilization process.

In this embodiment, a so-called cascade pump (peripheral pump) is used as the vapor mixing pump 4. This type of pump can produce very high pressurization effect compared to other pumps. Therefore, the pump is suitable for applications where it is necessary to smoothly introduce vapor having as low pressure as possible into the liquid and high pressurization effect as well as heating is required for the purpose of preventing cavitation, as in this type of heat sterilization process.

One embodiment of the vapor contact-type heating device according to the present invention has been described above, but the present invention is not limited to this embodiment, and can be also applied to a vapor contact-type heating device having a constitution other than that described above. Moreover, the portion (the vapor mixing pump 4 as a fluid transfer means) according to the features of the present invention is of course not limited to the form stated above, and various modifications can be made within the scope of the invention.

In the above embodiment, the case where the vapor supply port 46 for supplying vapor to the pressurizing duct 45 within the vapor mixing pump 4 is provided on the casing 43 in such a manner that it opens on the side closer to the inlet 41 than the middle position of the pressurizing duct 45 has been shown as an example, but the opening position can be optionally selected. For example, as shown by the broken line in FIG. 2, the vapor supply port 46 can be provided on the casing 43 so that the opening opens on the side closer to the outlet 42 than the middle position of the pressurizing duct 45. This is because the pressurizing characteristics vary depending on the shapes of the pressurizing duct 45 and the rotor 44 for some types of the pump used as the vapor mixing pump 4, and therefore controlling may be easier in some cases if the position of the vapor supply port 46 arranged depending on the heat sterilization temperature and the type of its processed fluid are variable parameters.

In the above embodiment, the case where a peripheral pump was applied as the vapor mixing pump 4 was described, but the pump is not limited to this, and various pumps can be used. Examples of usable pumps include non-positive displacement pumps such as centrifugal pumps and the like, and rotary positive displacement pumps such as rotary pumps, screw pumps and the like. The shape of the rotor 44 is not critical either. Of course, various fluid transfer means other than pumps can be used as long as they comprise the rotor 44 and are capable of increasing the pressure of the fluid and dynamically mixing the same simultaneously by the rotational action thereof.

In the above embodiment, the case where the control unit for measuring and controlling the fluid temperatures and flow rates of various kinds of fluids is provided to control the heat sterilization process has been described. That is, the case where the heat sterilization temperature and the pressure balance within the vapor mixing pump 4 are controlled by using the temperature of the liquid on the outlet side of the pump, the number of revolutions of the pump and the flow rate of vapor as control parameters has been shown as an example, but of course controlling can be carried out by using other parameters as control parameters. For example, it is possible to open and close various kinds of control valves by feeding back the pressure value in each point (e.g., the value of the pressure of the liquid measured on the inlet side of the pump, the value of the pressure of vapor measured upstream of the vapor supply port 46) with a pressure sensor, so that the sterilization temperature and the pressure balance within the pump stated above, or the amount of vapor supplied, etc., are controlled. Of course, the sterilization process can be also controlled in a state that the number of revolutions of the pump is a fixed parameter. For example, the sterilization process can be also controlled by adjusting the amount of vapor supplied by the sterilization temperature control unit TICA-1 with a fixed number of revolutions of the pump and the main back pressure regulating valve 7 being capable of adjusting the pressure of itself.

In the above embodiment, the case where the vapor contact-type heating device is applied to the heat sterilization process of the liquid has been described, but of course the application of the device is not limited to this. It can be suitably used to heat various liquids as, for example, a continuous liquid heating device, a hot water manufacturing device, etc., utilizing its excellent heating temperature controllability and its stability.

DESCRIPTION OF EMBODIMENTS

Examples

To demonstrate the advantages of the present invention, the vapor contact-type heating device according to the present invention was used to conduct a heat sterilization process of a fluid, and the processing performance in this process was evaluated.

More specifically, in the constitution according to FIG. 1, a pressure P2 MPa of the liquid on the outlet side (downstream of the outlet 42 of the vapor mixing pump 4) of the pump was set to have a predetermined value by the main back pressure regulating valve 7, and the pressure P1 MPa of the liquid on the inlet side of the pump was set to have a predetermined value by adjusting the number n Hz of revolutions of the pump. Moreover, the amount of vapor supplied was controlled by the aforementioned control unit (sterilization temperature control unit TICA-1) based on a temperature T2° C. on the outlet side of the pump so that the liquid after vapor has been mixed thereinto had a target heat sterilization temperature T0° C.

The results of the experiment are shown in FIG. 3. Herein, T1 represents the temperature ° C. of the liquid on the inlet side of the pump; P3 represents the pressure MPa of vapor introduced (the original pressure of the vapor introduced is shown on the left in the frame, and the pressure of the vapor at the inlet of the casing is shown on the right); P4 represents the pressure MPa of the liquid in the middle position of the pump (e.g., in FIG. 2, the pressure of the liquid in the position indicated by the broken line); and Q1 represents the flow rate L/H of the liquid on the inlet side of the pump. These results show that highly accurate temperature control with very little error is possible in any temperature setting, and in this case, the pressure of vapor supplied (pressure P3 of vapor introduced) is lower than pressure P2 on the outlet side of the pump. That is, it can be seen that the vapor pressure which can be supplied is equal to or lower than the saturated vapor pressure which varies depending to the above temperature setting, but, as in FIG. 3, controlling the pressure P1 on the inlet side of the pump and the pressure P2 on the outlet side enables supplying low-pressure (low-temperature) vapor.

The invention claimed is:

1. A vapor contact-type heat sterilization device comprising:
   a vapor mixing pump which transfers a liquid food with an increase in pressure by the action of a rotor, and which mixes vapor into the liquid food in a midway of pressurizing the liquid food, thereby heating the liquid food up to a sterilization temperature;
   a vapor supply region which is arranged inside the vapor mixing pump and supplies the vapor to the liquid food, the vapor having a higher pressure than a pressure of the liquid food; and
   a back pressure regulating valve which is arranged downstream of the vapor mixing pump,
   wherein the vapor mixing pump includes
      a casing having an inlet portion and an outlet portion for the liquid food, the rotor being contained within the casing,
      a partition portion formed between the inlet portion and the outlet portion in a circumferential direction of the rotor, and
      a fluid pressurizing duct for the liquid food, an entirety of the fluid pressurizing duct being formed partly annularly between the casing and the rotor along an outer circumferential periphery of the rotor so as to connect the inlet portion and the outlet portion to each other, wherein one end of the fluid pressurizing duct is connected to the inlet portion and another end of the fluid pressurizing duct is connected to the outlet portion,
   wherein the casing comprises a supply port for the vapor,
   wherein the supply port opens at a position along the fluid pressurizing duct, except for at an entrance of the fluid pressurizing duct, at which the liquid food is transferred from the inlet portion to the outlet portion with the increase in pressure, the vapor supply region being arranged at an opening portion of the supply port,
   and wherein the back pressure regulating valve maintains the pressure of the liquid food at the outlet portion and downstream of the outlet portion so as to be higher than a pressure of the vapor at the supply port for the vapor.

2. A vapor contact-type heat sterilization device according to claim 1, wherein the vapor mixing pump is a rotary positive displacement pump.

3. A vapor contact-type heat sterilization device according to claim 1, further comprising:
   a sterilization temperature control unit which adjusts an amount of the vapor to be supplied to the vapor mixing pump based on a temperature of the liquid food at a position downstream of the outlet portion of the vapor mixing pump, such that the temperature of the liquid food at the downstream position becomes the sterilization temperature.

4. A vapor contact-type heat sterilization device according to claim 3, wherein the supply port for the vapor opens at a position closer to the inlet portion with respect to a middle position of the fluid pressurizing duct.

5. A vapor contact-type heat sterilization device according to claim 1, wherein the supply port for the vapor opens at a position closer to the inlet portion with respect to a middle position of the fluid pressurizing duct.

* * * * *